United States Patent [19]

Gorin

[11] 4,162,963
[45] Jul. 31, 1979

[54] METHOD FOR PRODUCING HYDROCARBON FUELS AND FUEL GAS FROM HEAVY POLYNUCLEAR HYDROCARBONS BY THE USE OF MOLTEN METAL HALIDE CATALYSTS

[75] Inventor: Everett Gorin, San Rafael, Calif.

[73] Assignees: Continental Oil Company, Stamford, Conn.; The United States of America as represented by the United States Department of Energy, Washington, D.C.

[21] Appl. No.: 926,785

[22] Filed: Jul. 21, 1978

[51] Int. Cl.$^2$ .................. B01J 27/32; C10G 13/02; C10G 1/06
[52] U.S. Cl. .................. 208/108; 208/10; 208/251 R; 252/415; 423/DIG. 12; 423/107
[58] Field of Search .................. 208/108, 109, 110, 8, 208/10; 423/DIG. 12; 252/415–418

[56] References Cited

U.S. PATENT DOCUMENTS

| | | | |
|---|---|---|---|
| 3,355,376 | 11/1967 | Gorin et al. | 208/108 X |
| 3,371,049 | 2/1968 | Gorin et al. | 252/413 |
| 3,594,329 | 7/1971 | Gorin et al. | 252/417 |
| 3,625,861 | 12/1971 | Gorin et al. | 252/416 |
| 3,629,159 | 12/1971 | Gorin et al. | 252/414 |
| 3,948,759 | 4/1976 | King et al. | 208/106 |
| 4,081,400 | 3/1978 | Gorin | 252/415 |

*Primary Examiner*—Delbert E. Gantz
*Assistant Examiner*—G. E. Schmitkons
*Attorney, Agent, or Firm*—F. Lindsey Scott; William A. Mikesell, Jr.

[57] ABSTRACT

In a process for hydrocracking heavy polynuclear carbonaceous feedstocks to produce lighter hydrocarbon fuels by contacting the heavy feedstocks with hydrogen in the presence of a molten metal halide catalyst in a hydrocracking zone, thereafter separating at least a major portion of the lighter hydrocarbon fuels from the spent molten metal halide and thereafter regenerating the spent molten metal halide by incinerating the spent molten metal halide by combustion of carbon and sulfur compounds in the spent molten metal halide in an incineration zone, the improvement comprising: (a) contacting the heavy feedstocks and hydrogen in the presence of the molten metal halide in the hydrocracking zone at reaction conditions effective to convert from about 60 to about 90 weight percent of the feedstock to lighter hydrocarbon fuels; (b) separating at least a major portion of the lighter hydrocarbon fuels from the spent molten metal halide; (c) contacting the spent molten metal halide with oxygen in a liquid phase gasification zone at a temperature and pressure sufficient to vaporize from about 25 to about 75 weight percent of the spent metal halide, the oxygen being introduced in an amount sufficient to remove from about 60 to about 90 weight percent of the carbon contained in the spent molten metal halide to produce a fuel gas and regenerated metal halide; and (d) incinerating the spent molten metal halide by combusting carbon and sulfur compounds contained therein.

8 Claims, 1 Drawing Figure

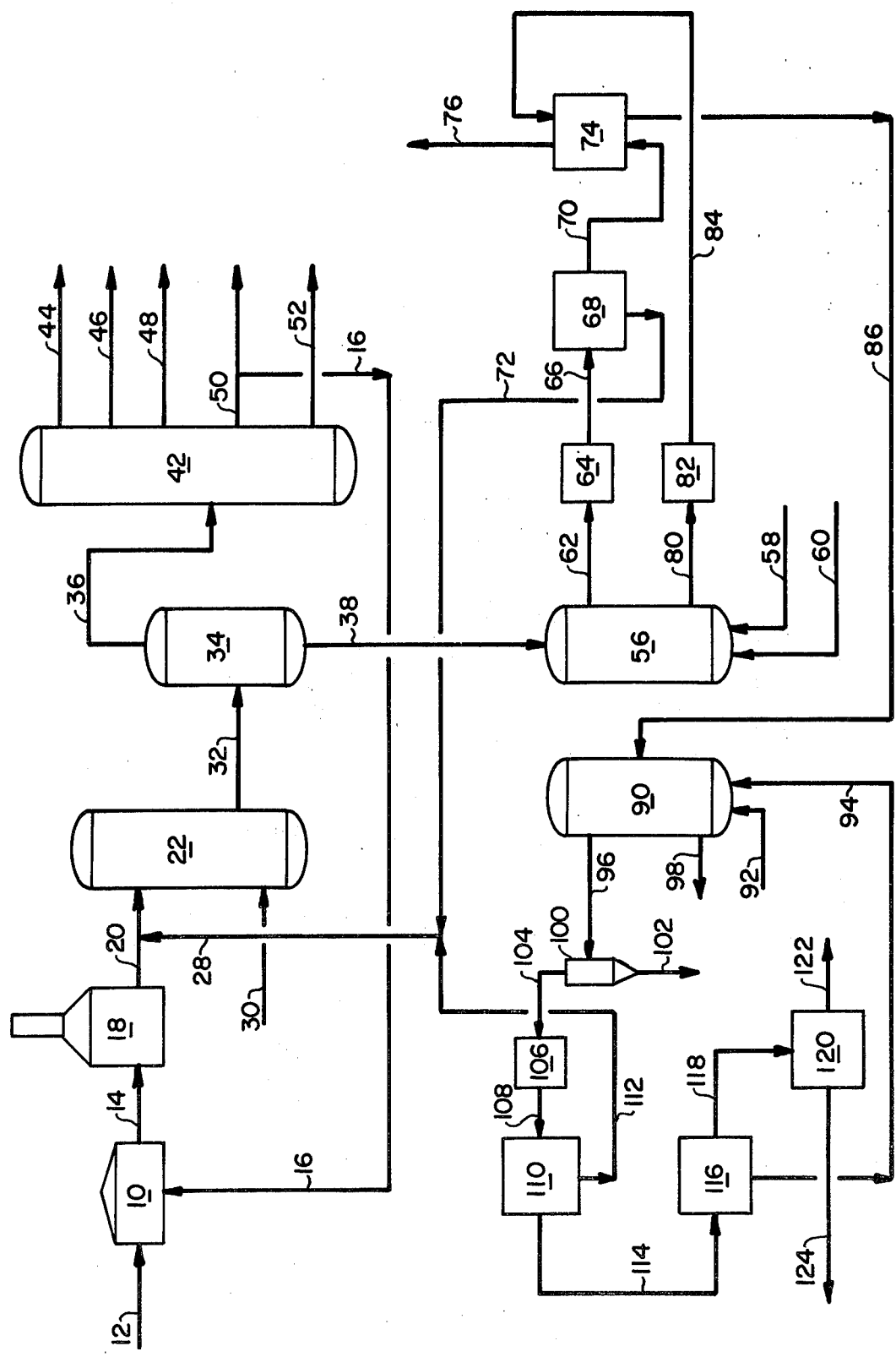

METHOD FOR PRODUCING HYDROCARBON FUELS AND FUEL GAS FROM HEAVY POLYNUCLEAR HYDROCARBONS BY THE USE OF MOLTEN METAL HALIDE CATALYSTS

This invention resulted from work done pursuant to a contract with the U.S. Department of Energy.

This application relates to the conversion of heavy aromatic polynuclear hydrocarbonaceous material into lower molecular weight hydrocarbon fuels by contacting such materials with hydrogen in the presence of a molten metal halide catalyst.

This invention further relates to an improvement in methods for hydrocracking heavy aromatic polynuclear carbonaceous materials by reacting such materials with hydrogen in the presence of a molten metal halide catalyst and thereafter recovering lower molecular weight hydrocarbon fuels from the reaction mixture whereby the reaction of the heavy aromatic polynuclear hydrocarbonaceous materials with hydrogen is conducted under conditions which results in the conversion of from about 60 to about 90 weight percent of said heavy hydrocarbonaceous materials to lower molecular weight hydrocarbon fuels with the spent molten metal halide being regenerated by reaction with oxygen and optionally carbon dioxide in a liquid phase gasification zone to produce a synthesis gas and a portion of the metal halide with the balance of the metal halide being regenerated by combustion of carbon and sulfur compounds remaining with the spent molten metal halide.

As a result of the continuing and well-known shortage of petroleum products such as gasoline, diesel fuel, natural gas, and the like, a continuing effort has been directed to the development of alternative fuel sources which do not depend upon petroleum as a feedstock. In particular, a considerable amount of effort has been devoted in recent years to the development of processes which will produce liquid and gaseous hydrocarbon fuels from coal feedstocks. One such process is the reaction of heavy aromatic polynuclear carbonaceous materials such as coal, coal extract and the like with hydrogen in the presence of molten metal halides to produce gasoline range materials and other lower molecular weight hydrocarbon fuels. One such process is shown, for instance, in U.S. Pat. No. 3,355,376 issued Nov. 28, 1967 to Gorin et al. Some similar processes are shown in U.S. Pat. No. 3,371,049 issued Feb. 27, 1968 to Gorin et al; U.S. Pat. No. 3,594,329 issued July 20, 1971 to Gorin et al; U.S. Pat. No. 3,625,861 issued Dec. 7, 1971 to Gorin et al; U.S. Pat. No. 3,629,159 issued Dec. 21, 1971 to Gorin et al; and U.S. Pat. No. 3,736,250 issued May 29, 1973 to Berg et al. These disclosures are hereby incorporated by reference. Such processes have utilized various metal halides with zinc chloride being preferred. In such processes, the lower molecular weight product hydrocarbons are normally recovered from the hydrocracking zone either as a gaseous stream or in mixture with the spent molten metal halide. The mixture is subjected to flashing, distillation, solvent extraction, or the like to recover the product hydrocarbons from the spent molten metal halide. Even after such recovery, considerable amounts of heavier product hydrocarbons and unreacted feedstock remain with the spent molten metal halide and present problems in the regeneration of the metal halide and the like. As set forth, for instance in U.S. Pat. No. 3,594,329, it is desirable that the carbon content of the spent melt passed to regeneration by incineration be maintained below about 6 weight percent unless external cooling of the incineration zone is provided.

In these processes, the quantities of hydrocarbons which remain with the molten metal halide, as passed to regeneration by incineration, are lost as products. As a result, the design of such processes has tended toward very severe conditions in the hydrocracking zone to produce lighter products which are more readily separated from the spent molten metal halide. The resulting equipment, to contain such more severe conditions, has been and is, very expensive. Accordingly, considerable effort has been directed to the development of improvements whereby the severity of the reaction conditions can be reduced without adversely affecting the conversion of the feedstock to lighter hydrocarbon fuels.

It has now been found that such losses can be minimized and the conversion of the feedstocks to lighter hydrocarbon fuels increased by an improvement in such processes whereby (a) the heavy feedstocks and hydrogen are contacted in a hydrocracking zone at reaction conditions effective to convert from about 60 to about 90 weight percent of the feedstock to lighter hydrocarbon fuels;

(b) the resulting spent molten metal halide is contacted with oxygen in a liquid phase gasification zone at a temperature and pressure sufficient to vaporize from about 25 to about 75 weight percent of said spent metal halide, said oxygen being introduced in an amount sufficient to remove from about 60 to about 90 weight percent of the carbon contained in said spent molten metal halide to produce a synthesis fuel gas and regenerated metal halide; and (c) the remaining molten metal halide is incinerated by combustion of carbon and sulfur compounds in the remaining molten metal halide in an incineration zone to vaporize the remaining metal halide.

By the improvement of the present invention, less severe reaction conditions are required in the hydrocracking zone but the resulting lower percentage conversion of the hydrocarbonaceous feedstocks results in a spent molten metal halide melt which is relatively high in carbonaceous material. This higher carbon content is used to produce a synthesis gas mixture in the liquid phase gasification zone. The carbon and sulfur compounds remaining with the spent molten metal halide withdrawn from the liquid phase gasification zone are burned in an incinerator to produce heat to vaporize the metal halide charged to the incinerator for recovery and recycle to the hydrocracking zone. The need for expensive high-pressure equipment in the hydrocracking zone is reduced and a valuable by-product is produced as the off-gas from the liquid phase gasification zone, thereby minimizing the loss of carbonaceous materials from the process.

The FIGURE is a schematic drawing of a process embodying the improvement of the present invention.

With reference to the FIGURE, a heavy aromatic polynuclear hydrocarbon feedstock, i.e., coal, is charged to a coal preparation plant 10 via a line 12. In preparation plant 10, the coal is optionally slurried with a hydrocarbon recycle stream from a line 16 to form a slurry of finely divided coal in oil which is passed via a line 14 to a heater 18 and then onward through a line 20 to a hydrocracking zone 22. Fresh molten metal halide catalyst from a line 28 is mixed with the coal slurry and the mixture is passed to hydrocracking zone 22. Hydrogen is charged to zone 22 through a line 30 and, while not shown, may optionally be heated. In zone 22, the reaction conditions normally used are a pressure from about 80 to about 400 atmospheres, a temperature from about 300 to about 500° C., and a hydrogen partial pressure from about 60 to about 250 atmospheres. When such reaction conditions are used in conjunction with a weight ratio of approximately 1 part molten metal halide per part of moisture-and-ash-free coal, conversions on the order of 70 to 95 weight percent or higher are typically obtained. By the improvement of the present invention, the reaction conditions can be in the lower portion of the stated ranges. Likewise, the coal throughput and correspondingly the space-time yield of the products can be suitably increased. A reaction product comprising unreacted coal, non-reactive solids, lighter hydrocarbon fuels, unreacted hydrogen and the like is withdrawn from vessel 22 through a line 32 and passed to a separator 34 where the hydrocarbon fuels, hydrogen and other volatile materials are recovered from the spent molten metal halide through a line 36 with the spent metal halide containing unreacted coal, non-reactive solids, residual quantities of hydrocarbon fuels and the like, being recovered through a line 38. The overhead stream recovered through line 36 is passed to a fractionator 42 where it is separated into a variety of product streams recovered through lines 44, 46, 48, 50 and 52. The product streams will vary dependent upon the particular coal used, the particular reaction conditions used, the particular products desired and the like. The products recovered through line 44 typically comprise gases and the major portion of the unreacted hydrogen. This stream may be recycled as such to hydrocracking zone 22 or the light hydrocarbon materials may be separated from the stream prior to its recycle to the hydrocracking zone. In any event, the hydrogen so recovered is normally returned to hydrocracking zone 22 to minimize the hydrogen requirements for the process. The remaining product streams typically comprise gasoline, turbine fuels, fuel oil and typically a heavy bottom stream recovered through a line 52 which is relatively resistant to further reaction upon continued recycling and the like. The amount of material recovered as a bottom stream will be minimal when the improvement of the present invention is used since normally less of the heavy hydrocarbon material remaining with the spent melt will be recovered and passed to fractionation. In prior processes, a considerable amount of heavier hydrocarbonaceous material was recovered and sent to fractionation because of the wish to minimize the amount of carbon remaining with the spent metal halide passing to regeneration. As set forth above, such is of less concern in the practice of the present improvement since the carbonaceous material passed to regeneration is recovered as a product. It is expected that normally some relatively inert heavy carbonaceous material will be recovered through bottoms line 52, although it is expected that this will be a relatively small stream and optionally it may be recycled to zone 22 or to the spent melt stream flowing through a line 38 to regeneration. The stream flowing through line 38, which comprises spent molten metal halide, residual carbon and sulfur compounds, non-reactive solids and the like is passed to a fluid gasification zone 56 where it is contacted with oxygen, injected through a line 58 and optionally carbon dioxide, injected through a line 60 to vaporize from about 25 to about 75 weight percent of the metal halide and convert from about 60 to about 90 weight percent of the carbon in the molten metal halide to a synthesis gas. The vaporized metal halide and the synthesis gas are recovered via a line 62 and passed to a heat exchanger 64 where the metal halide is condensed. The mixture is then passed through a line 66 to a metal halide recovery zone 68 where the metal halide is separated from the synthesis gas mixture and passed via a line 72 and line 28 to hydrocracking zone 22. The synthesis gas is recovered via a line 70 and passed to a hydrogen halide recovery zone 74 where hydrogen halide, such as HCl, is recovered by countercurrently contacting the synthesis gas stream with the spent melt withdrawn from zone 56. The synthesis gas is recovered via a line 76 and passed to use as a fuel, a feedstock to a methanation process, hydrogen production or the like.

At least a portion of the metal halide is maintained as a liquid in zone 56. The liquid metal halide is withdrawn via a line 80, passed through a heat exchanger 82 and then via a line 84 to hydrogen chloride recovery zone 74 to absorb hydrogen chloride from the synthesis gas in zone 74. From zone 74, the spent melt is passed via a line 86 to an incinerator zone 90 where it is incinerated by means known to those skilled in the art such as, for instance, by the use of an ebullated bed of a suitable fluidized refractory solid such as silica, sand or the like. Some suitable refractory solids are silica, sand, alpha-alumina, alumina silicates, such as mullite, zinc spinels, zinc oxide sinter, etc., as disclosed in U.S. Pat. No. 3,594,329. Typical conditions in incinerator zone 90 are a temperature below about 1100° C. and a pressure up to 10 atmospheres. The temperature is commonly from about 800° to about 1050° C. Oxygen is introduced through a line 92 and may be as such, as air, or any other suitable free-oxygen containing gas, such as oxygen-enriched air or the like. Optimally, a hydrogen halide such as HCl is also added via a line 94 to minimize the formation of metal oxides, and silicates such as ZnO, zinc silicates, and the like. Some means for removing ash and accumulated solids from the ebullated bed is required and the removal of solids is shown through a line 98. The removal of such solids and the operation of the ebullated bed are well known to those skilled in the art and need not be discussed further. The gaseous product recovered from incinerator 90 through a line 96 is passed to a solids separation section 100 shown as a cyclone where entrained solids are removed from the gaseous mixture and sent via a line 102 to further metal recovery. The solids typically comprise metal oxides, sulfides and a number of other refractory materials which are finely divided and are entrained in the gaseous mixture as it passes from incinerator 90. Typically, the solids are sent to further metal recovery as shown in U.S. Pat. No. 4,081,400, issued Mar. 28, 1978 to Everett Gorin. The gaseous mixture is passed through a line 104 to a heat exchanger 106 where the metal halide is condensed and then on to a metal halide recovery zone 110 via a line 108. The metal halide is recovered in zone 110 and returned to hydrocracking zone 22 via a line 112 and line 28. The noncondensible gases which comprise carbon oxides, sulfur oxide, nitrogen, hydrogen halide and the like are passed via a line 114 to a hydrogen halide recovery zone 116 via a line 114. Hydrogen halide is removed from the gaseous stream in reactor 116 and optionally recycled via a line 94 to zone 90. The gaseous mixture after removal of the hydrogen halide is recovered via a line 118 and passed to a sulfur removal zone 120 where sulfur oxides are removed from the gaseous mixture and passed to sulfur recovery via a line 124. The remainder of the gaseous mixture, which is primarily flue gas, is passed to discharge via a line 122.

While processes with which the present invention is effective may use zinc chloride, zinc bromide, zinc iodide, antimony bromide, antimony iodide, and the like as a catalyst, zinc chloride is most commonly used and is preferred. Various other metal salts may be used in the reaction mixture as shown, for instance, in U.S. Pat. No. 3,736,250 issued May 29, 1973 to Berg et al. and U.S. Pat. No. 3,764,515 issued Oct. 9, 1973 to Kiovsky. These disclosures are hereby incorporated by reference. While zinc chloride is a preferred metal halide, it is noted that the improvement of the present invention is effective with such processes generally.

While less severe reaction conditions may be used, it is noted that the process by which the spent molten metal halide is produced is known to those skilled in the art and forms no part of the present invention other than as a process in conjunction with which applicant's claimed improvement is effective to reduce the severity of the operating conditions.

The liquid gasification zone 56 is suitably operated at a temperature from about 800° to about 1100° C. and a pressure from about 20 to about 250 atmospheres. Preferable ranges are from about 900 to about 985° C. and from about 40 to about 150 atmospheres. The carbon content of the liquid molten metal halide charged to the liquid gasification zone is suitably from about 8 to about 25 weight percent based on the weight of the stream. A preferable range is from about 10 to about 15 weight percent. The amount of oxygen injected is suitably from about 0.3 to about 0.75 mols $O_2$ per mol of carbon with a preferred range being from about 0.35 to about 0.55. While it is not necessary, it is preferred that carbon dioxide also be injected. The amount of carbon dioxide used may be as much as about 4 mols of $CO_2$ per mole of $O_2$ although it is preferred that no more than about 1.0 mol of $CO_2$ be used per mol of $O_2$.

The mol ratio of carbon monoxide in the synthesis gas produced to the carbon in the molten metal halide (CO/C) is desirably between about 0.5 and about 1.5 and preferably between about 0.7 and about 1.0.

The operation of incinerator 90 is known to those skilled in the art as set forth, for instance, in U.S. Pat. No. 3,594,329 and forms no part of the present invention other than as a process step in the process improved by the Applicant's claimed improvement. Desirably, the spent metal halide melt passed through line 86 to incinerator 90 contains from about 0.5 to about 0.8 mols of carbon per mol of metal halide to provide sufficient heat upon combustion to vaporize the metal halide. Operating temperatures in the incinerator are typically from about 850° to about 1050° C. and from about 1 to about 10 atmospheres.

A small amount of HCl is generated in liquid phase gasification zone 56 largely by reaction of steam with zinc chloride via the reaction $$ZnCl_2 + H_2O = ZnO + 2HCl$$

The HCl is recovered in HCl absorption zone 74 by scrubbing the gases with product melt from zone 56. The recovery is accomplished by reducing the temperature in zone 74 to about 375°–450° C. and thus reversing the above reaction.

As indicated previously, it is necessary that at least a portion of the metal halide be maintained in the liquid gasification zone as a liquid. The removal of from about 25 to about 75 weight percent of the metal halide is a suitable operating range. The removal of from about 60 to about 90 weight percent of the carbon in the spent molten metal halide should be accomplished in the liquid gasification zone.

In the injection of the oxygen and carbon dioxide, it is desirable that the oxygen and carbon dioxide be injected in a ratio $CO_2/O_2$ from about 0.0 to about 1.0.

Several improvements are accomplished by the practice of the present invention. The pressures and temperatures required are less severe than those used heretofore when the only product recovery was from the spent melt mixture. Further, the use of high vacuums, stripping and the like to reduce the carbon content of the spent melt sent to regeneration is not necessary in the practice of the present invention since the carbon left in the spent melt is recovered as synthesis gas from liquid phase gasification zone 56.

Since liquid phase gasification zone 56 is operated under a substantial pressure, from 25 to 75 weight percent of the metal halide is recovered at a pressure suitable for recycling, thus avoiding the need for compressing the metal halide for recycle. Further, the metal halide recovered from liquid phase gasification zone 56 is substantially free of metal sulfides, metal oxides and the like, and is ready for recycle to hydrocracking zone 22. The recovery of metal values from metal sulfides, oxides, silicates and the like is accomplished in incinerator zone 90 which can be of a reduced size since a large portion of the metal halide has been removed already in liquid gasification zone 56. Further sulfur oxides are recovered in a more concentrated stream than were the whole of the spent metal halide stream recovered in incinerator zone 90. Clearly, there is no need to use pure oxygen or the like in incinerator 90 since the resulting flue gases are vented and, accordingly, oxygen can be supplied to incinerator 90 as air.

It is pointed out that the foregoing description of the present invention by reference to its preferred embodiments is illustrative rather than limiting in nature and that many variations and modifications are possible within the scope of the present invention. It is anticipated that many such variations and modifications may be considered obvious and desirable by those skilled in the art upon a review of the foregoing description of preferred embodiments and the following example.

EXAMPLE

This example is based on the use of residue from a short residence time hydrocracker run as feedstock to the liquid gasifier zone 56 shown in FIG. 1. The performance is based on heat and material balance calculations. These were made consistent with the known thermodynamic properties of the system.

The results given are based on 100 lbs. MAF (moisture-and-ash-free) Colstrip coal fuel to hydrocracking zone 22. The hydrocracking results and conditions are as shown below.

| Hydrocracking Conditions | (Zone 22) |
|---|---|
| Feed: | 100.0 lbs. MAF Coal - Slurried in Toluene |
| | 12.7 lbs. Ash |
| | 110.0 lbs. $ZnCl_2$ |
| Operating Conditions: | |
| Temperature | - 427° C. |
| Pressure | - 164 Atm. |
| Residence Time | - 33 minutes |
| Yield Structure - wt. % MAF Coal - Toluene-Free Basis | |

-continued

| | |
|---|---|
| Conversion to minus 475° C. Distillate | 75.6 |
| to Total Distillate | 82.4 |
| Hydrogen Consumption | 5.4 |
| Product Distribution | |
| CO | 1.2 |
| $CO_2$ | 2.0 |
| $CH_4$ | 0.7 |
| $C_2H_6$ | 0.1 |
| $C_3H_8$ | 1.8 |
| $iC_4H_{10}$ | 2.9 |
| $nC_4H_{10}$ | 0.4 |
| $C_5 \times 200°$ C. Distillate | 37.3 |
| $200 \times 475°$ C. Distillate | 20.7 |
| $+475°$ C. Distillate | 6.9 |

The calculated compositions of the various streams, as well as their temperature and pressure, are given in Tables I and II. The stream identifications correspond to those given in the FIGURE. All stream quantities except ash are given in mols/100 lbs. MAF coal feed to hydrocracker 22.

TABLE I

Heat and Material Balance
Liquid Phase Gasification of Spent Zinc Chloride Melt

| Line No. | 38 | 80 | 86 |
|---|---|---|---|
| Description | Spent Melt | Residual Melt | Residue Melt After HCl Absorption |
| Temp., °C. | 427 | 927 | 400 |
| Press. Atm. | 56 | 56 | 56 |
| $ZnCl_2$ (liquid) | 0.8088 | 0.2433 | 0.2696 |
| $NH_3$ as $ZnCl_2 \cdot NH_3$ | 0.0679 | — | — |
| $H_2O$ (liquid) | 0.036 | — | — |
| Ash (lbs.) | 11.88 | 11.88 | 11.88 |
| ZnS | 0.017929 | 0.01729 | 0.01729 |
| FeS | 0.00667 | 0.00667 | 0.00667 |
| Carbon | 1.234 | 0.1834 | 0.1834 |
| Organic $H_2$ | 0.7279 | — | — |
| ZnO | — | 0.0263 | — |

| Line No. | 58 | 62 | 76 |
|---|---|---|---|
| Description | Oxygen to Gasifier | Raw Gasifier Gas | Product Gas |
| Temp., °C. | 400 | 927 | 400 |
| Press. Atm. | 56 | 56 | 56 |
| $ZnCl_2$ (vapor) | — | 0.5219 | — |
| $O_2$ | 0.599 | — | — |
| $H_2O$ (vapor) | — | 0.0711 | 0.0974 |
| HCl | — | 0.0526 | — |
| $H_2$ | — | 0.7683 | 0.7683 |
| CO | — | 0.9653 | 0.9653 |
| $CO_2$ | — | 0.0857 | 0.0857 |
| $N_2$ | — | 0.0340 | 0.0340 |

TABLE II

Heat and Material Balance
Fluid Bed Combustion of Gasification Residue

| Line No. | 86 | 112 | 102 |
|---|---|---|---|
| Description | Residual Melt From Gasification | Regenerated $ZnCl_2$ | Ash |
| Temp., °C. | 427 | 400 | 900 |
| Press., Atm | 4.1 | 4.0 | 4.0 |
| $ZnCl_2$ (liquid) | 0.2696 | 0.2696 | — |
| Ash (lbs.) | 11.88 | — | 11.88 |
| ZnS | 0.01729 | — | — |
| FeS | 0.00667 | — | — |
| Carbon | 0.1834 | — | — |
| ZnO | | | 0.01729 |
| FeO | | | 0.00667 |

TABLE II-continued

Heat and Material Balance
Fluid Bed Combustion of Gasification Residue

| Line No. | 92 | 96 |
|---|---|---|
| Description | Air to Incinerator | Products from Incinerator |
| Temp., °C. | 427 | 927 |
| Press., Atm. | 4.5 | 4.1 |
| $ZnCl_2$ (vapor) | — | 0.2696 |
| $O_2$ | 0.9300 | 0.9300 |
| $SO_2$ | — | 0.0240 |
| $CO_2$ | — | 0.1833 |
| HCl | 0.04 | 0.0054 |
| $H_2O$ (vapor) | — | 0.0173 |

Several points may be noted with regard to the calculations given:

(1) The $CO+H_2$ yield in the liquid phase gasification when converted to pure hydrogen amounts to 3.5 weight percent of the MAF coal. This corresponds to approximately 65 percent of the chemical hydrogen consumption required for the hydrocracker.

(2) The utilization of carbon for production of hydrogen plus hydrocarbons is very high, i.e., 97 percent of the carbon in the coal feed.

(3) Sixty-five percent of the spent zinc chloride is recovered as high pressure regenerated liquid in the liquid phase gasification operation.

(4) The yield of $C_4+$ liquid distillate product is very high, i.e., 5.2 bbls/ton MAF coal. The above includes the $+475°$ C. distillate.

(5) The product distribution given above corresponds to the case where naphtha is used as the slurrying vehicle for the coal feed to the hydrocracker.

Where the $+200°$ C. distillate is used as the vehicle, the product distribution will change, i.e., the naphtha yield will go up substantially and the heavier distillate yield will decrease substantially.

General Operating Conditions

The general operating conditions to be employed in the liquid phase gasification process is a function of the feed composition. The pressure and temperature relationships must be established such that a liquid phase is retained, i.e., complete vaporization of the zinc chloride must be prevented. This dictates the minimum operating pressure that must be maintained at any given temperature. For a given oxygen input, more heat is released as the $CO_2/CO$ ratio of the product gas increases. Recycle of carbon dioxide is required, when reaction kinetics does not permit achievement of a high $CO/CO_2$ ratio or when the carbon content of the spent melt is high. The operating pressure must be increased as the temperature is increased or the carbon content of the spent melt is increased. The reciprocal relationships also are valid. Carbon dioxide recycle at a given temperature and operating pressure becomes necessary after a minimum carbon content of the spent melt is exceeded. Further increase in carbon content of the spent melt beyond the above limiting value will increase the required amount of recycle carbon dioxide.

The following table gives the broad and preferred range of the operating conditions:

| | Broad Range | Preferred Range |
|---|---|---|
| Temp., °C. | 800–1100 | 900–985 |
| Press., Atm | 20–250 | 40–150 |

-continued

|  | Broad Range | Preferred Range |
|---|---|---|
| Wt.% Carbon Spent Melt Feed | 8–25 | 10–15 |
| Mols $O_2$/mol Carbon | 0.30–0.75 | 0.35–0.55 |
| Mols $CO_2$/mol $O_2$ Feed | 0–4.0 | 0–0.1 |

The conditions in the above range are regulated to burn off from 60 to 90 percent of the carbon in the spent melt while vaporizing from about 25 to 75 percent of the zinc chloride. It is desired to maximize the yield of CO/mol carbon in the spent melt. The above value should fall within the range of 0.5 to 1.5 preferably from 0.7 to 1.0.

The residue melt from the liquid phase gasification must have a sufficient carbon content to sustain adiabatic combustion of the melt in the vapor phase combustor. Suitable carbon contents are in the range of about 0.5 to 0.8 mols C/mol $ZnCl_2$ in the gasification residue. Operating temperatures and pressures in the incinerator are in the range of 850°–1050° C. and 1–10 atmospheres while the preferred ranges are 900°–950° C. and 2–6 atmospheres.

Having thus described the invention, I claim:

1. In a process for hydrocracking heavy polynuclear carbonaceous feedstocks to produce lighter hydrocarbon fuels by contacting said heavy feedstocks with hydrogen in the presence of molten zinc chloride catalyst in a hydrocracking zone, thereafter separating at least a major portion of said lighter hydrocarbon fuels from the spent molten zinc chloride and thereafter regenerating the spent molten zinc chloride by incinerating the spent molten zinc chloride by combustion of carbon and sulfur compounds in said spent molten zinc chloride in an incineration zone, the improvemnt comprising:

(a) contacting said heavy feedstocks and said hydrogen in the presence of said molten zinc chloride in said hydrocracking zone at reaction conditions effective to convert a major portion of said heavy feedstocks to lighter hydrocarbon fuels;

(b) contacting said spent molten zinc chloride with oxygen in a liquid phase gasification zone at a temperature and pressure sufficient to vaporize from about 25 to about 75 weight percent of said spent zinc chloride, said oxygen being introduced in an amount sufficient to remove from about 60 to about 90 weight percent of the carbon contained in said spent molten zinc chloride and produce a fuel gas; and (c) incinerating the remaining molten zinc chloride by combustion of the carbon and sulfur compounds in said remaining molten zinc chloride in an incineration zone to vaporize said remaining zinc chloride.

2. The improvement of claim 1 wherein said zinc chloride vaporized in said liquid gasification zone is recovered and recycled to said hydrocracking zone.

3. The improvement of claim 1 wherein said zinc chloride vaporized in said incineration zone is recovered and recycled to said hydrocracking zone.

4. The improvement of claim 1 wherein said reaction conditions comprise a reaction pressure less than about 200 atmospheres.

5. The improvement of claim 1 wherein from about 85 to about 90 weight percent of said heavy feedstock is converted.

6. The improvement of claim 1 wherein said spent molten zinc chloride is contacted with oxygen and carbon dioxide in said liquid phase gasification zone.

7. The improvement to claim 6 wherein said oxygen is injected in an amount equal to from about 0.3 to about 0.75 mols $O_2$ per mol of carbon in said spent molten zinc chloride.

8. The improvement of claim 6 wherein said carbon dioxide is injected in an amount up to 4 mols $CO_2$ per mol of $O_2$.

* * * * *

UNITED STATES PATENT OFFICE
CERTIFICATE OF CORRECTION

Patent No. 4,162,963          Dated July 31, 1979

Inventor(s) Everett Gorin

It is certified that error appears in the above-identified patent and that said Letters Patent are hereby corrected as shown below:

Col. 7; line 35: "0.017929" should read --0.01729--

Col. 8;    TABLE II-continued  should read as follows:

Heat and Material Balance
Fluid Bed Combustion of Gasification Residue

| Line No. | 92 | 96 |
|---|---|---|
| Description | Air to Incinerator | Products from Incinerator |
| Temp., °C | 427 | 927 |
| Press., Atm. | 4.5 | 4.1 |
| $ZnCl_2$ (vapor) | – | 0.2696 |
| -- $O_2$ | 0.2413 | 0.0219 -- |
| -- $N_2$ | 0.9300 | 0.9300 -- |
| $SO_2$ | – | 0.0240 |
| $CO_2$ | – | 0.1833 |
| HCl | 0.04 | 0.0054 |
| $H_2O$ (vapor) | – | 0.0173 |

Signed and Sealed this

Twenty-third Day of October 1979

[SEAL]

Attest:

RUTH C. MASON  
*Attesting Officer*

LUTRELLE F. PARKER  
*Acting Commissioner of Patents and Trademarks*